Figure 1:
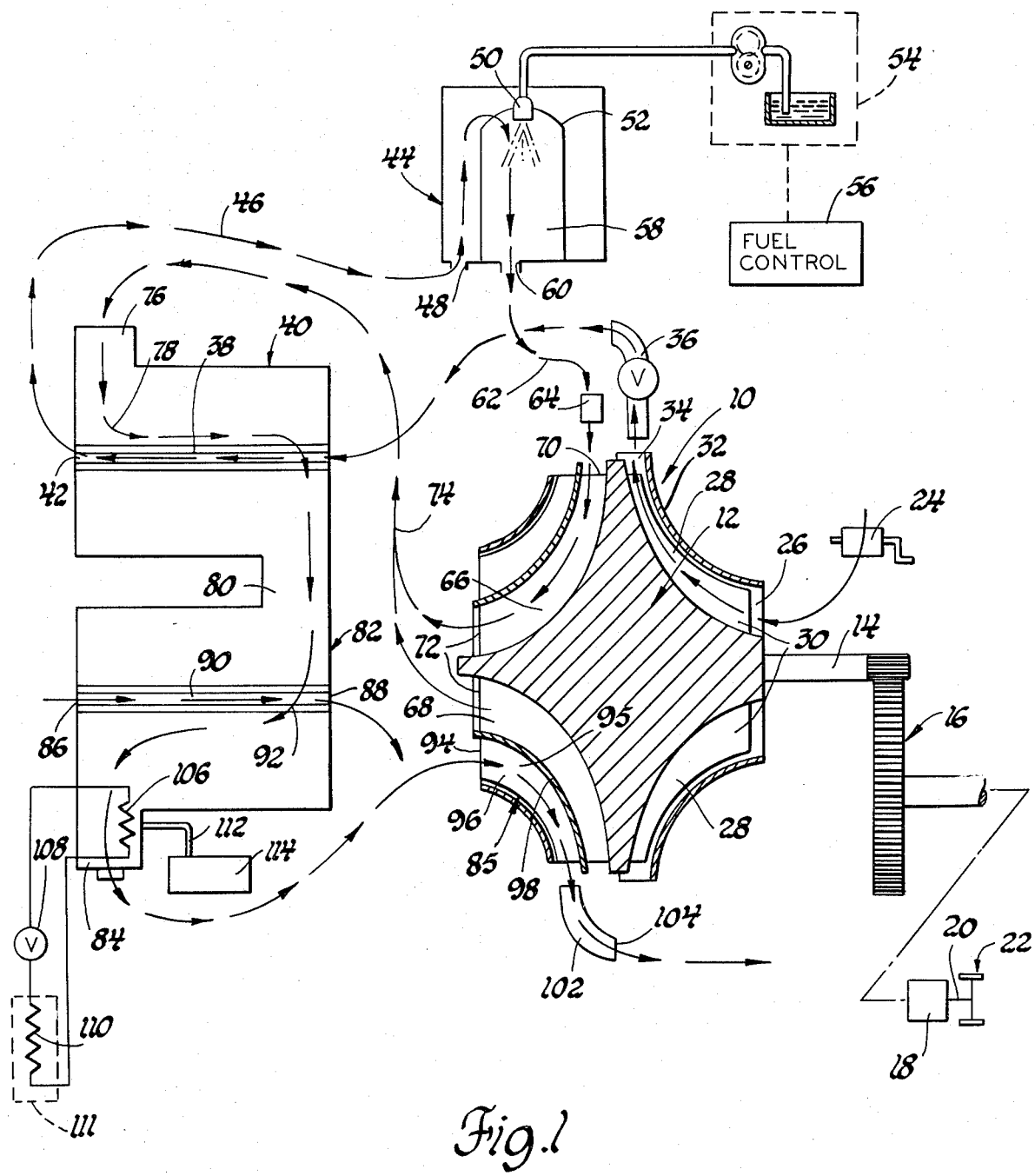

United States Patent [19]
Walker

[11] 4,301,649
[45] Nov. 24, 1981

[54] SINGLE ROTOR ENGINE WITH TURBINE EXHAUSTING TO SUBATMOSPHERIC PRESSURE

[75] Inventor: Frank H. Walker, Grand Blanc, Mich.

[73] Assignee: General Motors Corporation, Detroit, Mich.

[21] Appl. No.: 69,561

[22] Filed: Aug. 24, 1979

[51] Int. Cl.³ .............................................. F02C 7/10
[52] U.S. Cl. .................................. 60/39.07; 60/39.5; 60/39.51 R
[58] Field of Search ................. 60/39.07, 39.41, 39.43, 60/39.5, 39.51 R

[56] References Cited

U.S. PATENT DOCUMENTS

| | | | |
|---|---|---|---|
| 1,601,402 | 9/1926 | Lorenzen | 60/39.18 C |
| 2,391,779 | 12/1945 | Griffith | 60/39.43 |
| 2,469,678 | 5/1949 | Wyman | 60/39.55 |
| 2,514,874 | 7/1950 | Kollsman | 60/39.35 |
| 2,986,882 | 6/1961 | Pavlecka | 60/39.15 |
| 3,369,361 | 2/1968 | Craig | 60/39.41 |
| 3,756,019 | 9/1973 | Holzaptel et al. | 60/39.43 |
| 3,981,140 | 9/1976 | Lunsford et al. | 60/39.03 |

OTHER PUBLICATIONS

Gasparovic, N. *Gas turbine Cycle Operating Partly at Subatmospheric Pressure* in Naval Engineering Journal, Dec., 1974.
Rogers, C. *Design and Development of a Monorotor Gas Turbine Auxiliary Unit*, Paper presented to ASME, Dec., 1978.

*Primary Examiner*—Louis J. Casaregola
*Attorney, Agent, or Firm*—J. C. Evans

[57] ABSTRACT

An automotive single shaft gas turbine engine has a monorotor with a plurality of radial flow compressor blades thereon discharging compressed air to a recuperator for transferring heat from engine exhaust to the inlet combustion air to a combustor which produces motive fluid directed across a plurality of radial inflow turbine vanes on the monorotor and wherein the automotive gas turbine engine is further associated with an exhaust flow system including the regenerator, a series connected intercooler and a secondary compressor to produce a subatmospheric pressure source in the engine gas cycle to improve the thermal efficiency of the engine cycle and to further define a vacuum source for operating automotive accessories; and to provide a heat source at subatmospheric pressure for passenger compartment heater operation. The subatmospheric source is connected to the secondary compressor which is operative to compress turbine exhaust gas back to one atmosphere of pressure for discharge to the environment. The secondary compressor and the inlet compressor establishing a pressure build-up and pressure depression in the system which in one embodiment is across a series arranged, two-stage radial and axial turbine to produce an overall turbine pressure ratio for increasing the temperature drop across the turbine thereby to decrease work load of the downstream heat exchanger components between the outlet of the turbine stages and the secondary compressor.

4 Claims, 2 Drawing Figures

SINGLE ROTOR ENGINE WITH TURBINE EXHAUSTING TO SUBATMOSPHERIC PRESSURE

This invention relates to single shaft automotive gas turbine engines and more particularly to single shaft automotive gas turbine engines having a monorotor component therein operated in association with variable geometry turbine vane components to increase the turbine inlet temperature thereby to improve thermal efficiency and standard fuel consumption of the engine.

It is recognized that single shaft automotive turbine engines including variable geometry inlet guide vanes to a centrifugal compressor and variable geometry nozzle vanes to a radial turbine can have substantial fuel saving potential which is due to the control of the turbine inlet temperatures in accordance with engine load conditions so that specific fuel consumption is reduced at low power conditions of operation. Use of single shaft automotive turbine engines requires a continuously variable transmission which takes many forms but has the advantage of directly coupling the variable speed output of the compact automotive type single shaft gas turbine engine configurations to a driven load represented by the driven wheels of an automotive type vehicle.

An object of the present invention is to improve the desirable characteristics of a single shaft automotive gas turbine engine by the provision therein of a monorotor having an inlet air compressor for supplying air to the combustor of the gas turbine engine and further having a plurality of turbine vanes for converting energy from motive fluid directed thereacross to operate an output power shaft from the monorotor and wherein an improved exhaust system is associated with the outlet from the turbine side of the monorotor to concurrently extract energy therefrom in a recuperator which is in series with an intercooler and secondary compressor for reducing pressure of exhaust gases from the turbine to a subatmospheric pressure level at the gas side of the intercooler thereby to improve the specific power characteristics of the gas turbine engine and wherein the secondary compressor returns the exhaust gas back to atmospheric pressure for discharge to the engine environment; the engine further being improved by means for extracting vacuum from the gas side of the intercooler for operating automotive accessories and by the further inclusion in the system of a heat exchanger for providing heat from the subatmospheric pressure source for use in passenger compartment conditioning.

A further object of the present invention is to provide an improved single shaft automotive gas turbine engine of the type set forth in the preceding object wherein the power turbine consists of a first turbine stage of a radial configuration and of an outlet turbine stage therefrom of an axial configuration having an increased pressure ratio thereacross thereby to increase the temperature drop across the combined turbine components so as to decrease the work load of the downstream recuperator and intercooler components of the system.

Yet another object of the present invention is to improve an engine as set forth in the first object by including the secondary compressor within the confines of the monorotor by the provision of a second plurality of compressor vanes thereon so that the turbine portion of the monorotor will be cooled by heat transfer to the secondary compression flow path for reducing the operating temperature of the monorotor.

Yet another object of the present invention is to provide a single shaft automotive gas turbine engine of the type set forth in the first object above wherein the rotor includes a radial stage in series connection with an axial stage for maintaining a high pressure ratio across the turbine thereby to increase the temperature drop thereacross so as to decrease the workload of the downstream recuperator and intercooler of the combination and wherein the secondary compressor of the engine is a plurality of compressor blades on the monorotor that are located in heat exchange relationship with gas flow through the turbine flow passages of the monorotor to reduce the operating temperature of the monorotor during gas turbine engine operation.

Further objects and advantages of the present invention will be apparent from the following description, reference being had to the accompanying drawings wherein a preferred embodiment of the present invention is clearly shown.

Figure 2:
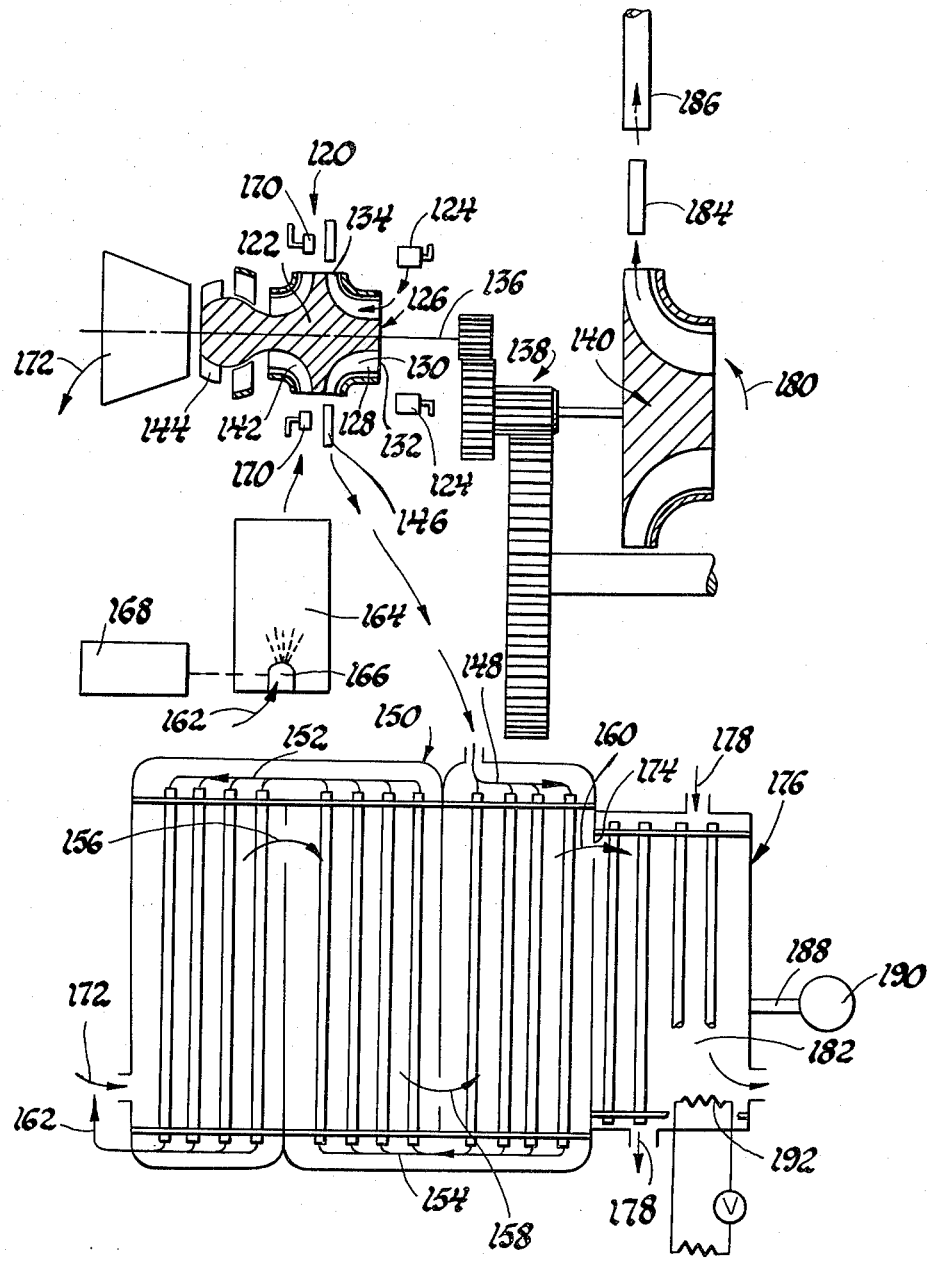

FIG. 1 is a diagrammatic view of a single shaft automotive gas turbine engine with the improved heat exchange exhaust system of the present invention; and FIG. 2 is a diagrammatic view of a second embodiment of the present invention.

Referring now to the drawings, in FIG. 1 a single shaft automotive gas turbine engine system 10 is illustrated. It includes a monorotor 12 having a drive shaft 14 therefrom connected through a reduction gear set 16 to a variable speed transmission 18 of the type more specifically set forth in U.S. Pat. No. 3,739,658, issued June 19, 1973, to Scheiter, coupled to a drive shaft 20 for driving a load representatively shown by driven road engaging wheel assemblies 22. In the illustrated arrangement a variable inlet guide vane assembly 24 directs ambient air to the inlet 26 leading to a plurality of compressor vanes 28 on the monorotor 12 having gas flow passages 30 therebetween from the inlet 26 as bounded by a shroud 32 for passage through a radially outwardly located discharge passage 34 that directs compressed air into a variable compressor diffuser 36. Exhaust from the variable compressor diffuser 36 is directed through a compressed air passage 38 in a recuperator assembly 40 that has an outlet 42 therefrom connected by suitable conduit means to a combustor 44. The recuperator assembly 40 as will be discussed, extracts energy from the turbine exhaust fluid that drives the monorotor 12 to thereby preheat the inlet air to the engine 10 for improved thermal efficiency. More specifically, the heated gas flow is through conduit means shown diagrammatically by the arrows 46 which communicate with an inlet 48 to the combustor 44. While the combustor 44 is diagrammatically illustrated, it should be understood that the compressed air flow thereto is directed into an air fuel nozzle 50 and is supported on an inlet dome 52 of the combustor 44 where air and fuel from a source 54 under the control of suitable control means 56 produces combustion within a chamber 58 of the combustor 44 to produce high temperature gases directed through an outlet 60 thence through a transition duct represented by the duct arrow 62 in FIG. 1. Exhaust flow from the transition duct arrow 62 is directed through a variable turbine nozzle assembly 64 hence through a plurality of circumferentially spaced gas flow passages 66 on the monorotor 12 formed thereon by a plurality of circumferentially spaced turbine vanes 68. In the illustrated arrangement the gas flow passages 66 are radial inflow paths having a radially outwardly located turbine passage inlet 70 and including an axially directed turbine outlet in 72 from whence exhaust gases are directed through a duct represented by the arrow 74 in FIG. 1 to the inlet 76 of the recuperator 40 on the low pressure gas side thereof. The low pressure gas path 78 through the recuperator 40 communicates through a crossover duct 80 to the gas side of an intercooler 82.

Exhaust flow through the low pressure gas path 78 is in cross flow relationship with inlet air flow through the recuperator assembly 40 whereby inlet air to the combustor 44 is preheated.

In accordance with the present invention the recuperator and the crossover duct 80 thereto constitutes the inlet passage to an intercooler 82 which serves as an improved downstream heat exchange system which in conjunction with a downstream secondary compressor 85 produces a subatmospheric region 84 at the gas side outlet of the intercooler 82. More particularly, by vehicle motion induced ram air is directed through a ram air inlet 86 to the intercooler 82 thence to a ram air outlet 88 through a cooling air pass 90 of the intercooler 82. The cooling air pass 90 is located in cross flow relationship with the turbine exhaust flow pass 92 of the intercooler 82 downstream of the crossover duct 80. The subatmospheric region 84 is maintained by the secondary compressor 85 that in the embodiment of FIG. 1 has an inlet 94 to passages 95 between a plurality of circumferentially spaced, radially outwardly formed blades 96 that are located circumferentially around the monorotor 10 radially outwardly of the turbine vane passages 66 therein and separated therefrom by an inboard shroud 98 across which heat exchange occurs so that the monorotor 10 is cooled further.

The secondary compressor 85 thereby draws gas from the region 84 to maintain subatmospheric conditions therein and extracts enough energy from the monorotor 12. The exhaust gas pressure level is increased through an exhaust diffuser 102 to atmospheric pressure from whence it is discharged through an outlet 104 to the environment of the gas turbine engine 10.

The recuperator and intercooler heat exchanger arrangement downstream of the turbine exhaust outlet from the monorotor 12 and the provision of the secondary compressor 85 constitutes a gas cycle for use in the single shaft automotive gas turbine engine environment that will produce increased thermal efficiency. The illustrated arrangement especially is suited for automotive gas turbine engines since a heater core 106 can be located in the subatmospheric region 84 so that exhaust gases from the turbine can be utilized to heat a secondary fluid passing through the core which is directed by suitable circulating means 108 to a heater 110 for conditioning an automotive passenger compartment 111. Since the region 84 is below atmospheric pressure any flow from the circulating means 108 will be into the subatmospheric region 84, thus to assure separation of the two systems while maintaining an instant heat source for conditioning the passenger compartment. A further feature of the present invention is that the subatmospheric pressure within the region 84 can be tapped by a conduit 112 and directed into a vacuum system 114 for operating various vacuum powered components such as door locks, windshield wipers and the like on an automotive passenger vehicle.

A representative operating cycle is set forth in the following tabulation which indicates predicted temperature and pressures at the various points in the representatively illustrated operating cycle.

The following operation cycle traces pressure and temperature conditions sequentially between the start of the air flow path to the engine exhaust.

| COMPONENTS | CONDITIONS | |
|---|---|---|
| | Pressure (atm) | Temperature (°F.) |
| Variable Inlet Vanes | 24 | 1 | 60 |
| Compressor Vane Path | 28 | — | 60–450 |
| Variable Compressor Diffuser | 36 | 5 | 450 |
| Recuperator Pass | 38 | 5 | 450–900 |
| Combustor | 44 | 5 | 900–2200 |
| Variable Turbine Nozzle | 64 | 5 | 2200 |
| Turbine Vane Path | 66 | — | 2200–1000 |
| Turbine Diffuser | 74 | .4 | 1000 |
| Recuperator Gas Pass | 78 | .4 | 1000–550 |
| Intercooler Gas Pass | 92 | .4 | 550–150 |
| Rotor Exhaust Path | 96 | — | 150–300 |
| Diffuser | 102 | 1 | 300 |
| Exhaust Pipe | 104 | 1 | 300 |

In the illustrated arrangements, vehicle induced ram air is routed through the air side of the intercooler 82 and the two-stage compression flow paths and turbine gas flow passages are included in a single rotor casing wherein the high temperature turbine gas path is located between the two compressor paths for improved cooling of the rotor during hot gas flow therethrough.

Projected estimates are that the turbine inlet gas temperatures might be increased in the order of 360° F. to 400° F. over current practices without exceeding the critical limiting metal temperature of the monorotor 12. Such increases in operating temperature ratios results in a cycle efficiency gain which more than offsets the increased compressor work caused by the use of the secondary compressor. By virtue of the improved exhaust system the turbine expansion ratio can be in the order of 12 to 1. This increases energy recovery in the turbine stage and results in a decreased turbine outlet temperature. Accordingly, there will be a decrease in the rotor temperature at the hub area thereof. Since this is normally a high stress area, the reduced operating temperature thereof can allow increases in turbine inlet temperature by adjusting the position of the variable geometry control described above in a manner as more specifically set forth in U.S. Pat. No. 3,981,140, issued Sept. 21, 1976, to Lunsford et al. Moreover, the lower turbine outlet temperature decreases the relative size requirements for the downstream heat exchange system because there is less heat recovery therein.

A further advantage of the presence of lower turbine outlet temperatures is that there is a lesser requirement for high alloy materials in the system and this in turn leads to a lesser need for complicated processes of fabrication of the downstream heat exchanger of the system. Thus, operation of the heat exchanger components can be maintained at a temperature level where aluminum or other low cost, lightweight materials can be used therein with a resultant reduction in the weight of the total package for automotive passenger applications. Moreover, the lower exhaust discharge temperature decreases the discharge air volume as well as its heat intensity.

Referring now to the second embodiment of the present invention illustrated in FIG. 2, a single shaft automotive gas turbine engine system 120 is illustrated including a monorotor 122 having inlet airflow thereto under the control of a variable geometry inlet vane assembly 124. Airflow therefrom is directed through the inlet of a compressor 126 including a plurality of circumferentially spaced compressor blades 128 on the monorotor 122. The blades 128 have compressor passages 130 therebetween communicated between an annular inlet 132 faced in an axial direction and a radial outlet 134 from the compressor 126. The monorotor has a drive shaft 136 therefrom that is connected through a gear reduction set 138 to a secondary compressor 140 that serves to produce the subatmospheric region within the system 120.

Monorotor 126 has a radial inflow first turbine stage 142 thereon and an axial flow second turbine stage 144 thereon.

Compressed air flow from compressor 126 is directed through variable compressor diffuser 146 to the high pressure gas pass 148 of a recuperator 150. Gas pass 148 is in series flow with second and third gas pass 152, 154 in recuperator 150. All the gas passes 148, 152, 154 are in cross-flow relationship to turbine exhaust passes 156, 158 and 160 whereby the compressed air through recuperator 150 is heated for discharge from the recuperator outlet 162 to a combustor 164. The combustor 164 burns an air/fuel mix from nozzle 166 therein under the control of a fuel controller 168.

The combustor gases are directed by a variable geometry inlet nozzle 170 to the first and second turbine stages 142, 144. Exhaust therefrom is through a turbine diffuser which communicates with an exhaust inlet 172 to recuperator 150.

The exhaust gas outlet 174 from recuperator 150 communicates with the inlet to an intercooler 176 cooled by vehicle induced ram air flow 178 therethrough. The exhaust gas is thereby cooled prior to passage to the inlet 180 of secondary compressor 140 which maintains a subatmospheric region 182 in the intercooler 176.

As in the first embodiment of the invention air-to-gas intercooler 176 has ram air flow therethrough to further cool exhaust at the subatmospheric region 182 that is maintained at the subatmospheric pressure level by connection to the inlet of the secondary compressor 140. Compressor 140 raises the pressure of the exhaust flow from the subatmospheric region to atmospheric through compressor diffuser 184 for discharge through a tailpipe 186.

By virtue of the provision of the illustrated heat exchanger exhaust system in the single shaft automotive gas turbine engine 120 in the embodiment of FIG. 2, there, in effect, is a two-stage (push-pull) compression action within the system much like that in the combined compressed air flow patterns within the monorotor 12 of the embodiment in FIG. 1.

Such two-stage compression and the two-stage turbine arrangement, one radial and one axial, produces an overall high pressure ratio across the turbine stages. This increases the temperature drop across the turbine and decreases the workload of the heat exchanger downstream thereof. Moreover, the recuperator 150, because of its location between the second stage axial turbine 144 and the secondary compressor 140 is such that there will be reduced work required of the secondary compressor. The exhaust gas temperature and flow rates from the turbines are significantly lower than in current automotive gas turbine engines partly as a result of the intercooler and the high specific power capabilities of the engine which reduces its overall total gas flow requirements.

Moreover, with a high pressure drop across the two-stage turbine arrangement, a good rotor cooling is accomplished in the area of the turbine outlet so that the operating temperature of the monorotor metal can be reduced so as to reduce the need for high alloy metals therein. Moreover, because of the reduced second stage nozzle temperatures, variable geometry nozzle components 170 between the turbines 142, 144 can be made from conventional materials.

In the illustrated arrangement the secondary compressor 140 delivers a relatively high volume of low pressure exhaust gas. Because of its relatively greater size it is convenient to drive it from the first stage of a two-stage gear reduction system as shown at 138 in FIG. 2. While there is an added cost because of the presence of the second stage compressor and turbines in the embodiment of FIG. 2, the improved specific power capabilities of the engine and the improved thermal efficiency because of the recuperated downstream heat exchanger configuration are offsetting considerations. Moreover, there is a lower dependence on heat exchange because of the reduced temperature at the outlet of the second stage turbine 142. As in the first embodiment, the system 120 enables a vacuum conduit 188 to be connected to the subatmospheric region 182 to supply automotive accessories 190. Moreover, a heat exchanger 192 can be located within the subatmospheric region 182 to provide failsafe passenger compartment conditioning. Because of the immediate presence of hot gas in the subatmospheric region during engine operation, the heat source for compartment conditioning will be instant. Furthermore, because of the efficiency of the system, there will be some reduction in the size of the components as compared to conventional automotive gas turbine engine components.

By way of summary, the aforesaid system makes use of increased gas temperatures in an automotive single shaft gas turbine program while maintaining currently acceptable component temperatures at the rotor high stress regions of rotor operation. An increased engine pressure ratio can be maintained across turbine stages by a unique arrangement of two stages of compression in the automotive system. The single shaft system is readily adapted to automotive application by the inclusion of a continuously variable transmission having high efficiency over a broad speed ratio of speed vehicle operation.

When combined with proven state of the art gas turbine engine advances, computer analysis predicts a demonstration engine that will deliver specific fuel consumption in excess of 10% better than predicted alternative diesel and/or gasoline powered piston engines.

While the embodiments of the present invention, as herein disclosed, constitute a preferred form, it is to be understood that other forms might be adopted.

The embodiments of the invention in which an exclusive property privilege is claimed are defined as follows:

1. An automotive gas turbine engine assembly comprising: a rotor having a first fluid flow path therein operable to compress inlet air, means for combusting the compressed inlet air with fuel for producing a discharge of motive fluid, means forming a turbine for extracting energy from said motive fluid discharge and operable to drive said rotor to induce flow through said first flow path, recuperator means for transferring heat of exhaust from said turbine to discharge flow from said first path prior to its passage into said combustor means, intercooler means, means for connecting said recuperator means to said intercooler means, said intercooler means having a ram air inlet with a cooling air pass therefrom supplied by cooling air in response to forward vehicle movement to cool exhaust from said recuperator means, and a secondary compressor for reducing the pressure of said turbine exhaust gas to a predetermined subatmospheric pressure level to define a subatmospheric source of heating fluid, thereby to improve engine cycle efficiency, and means including said secondary compressor defining a compression flow path operative to draw fluid from said subatmospheric source for discharge to atmosphere to produce an exhaust compression mode thereby to complete engine gas flow back to atmosphere.

2. An automotive gas turbine engine assembly comprising: a rotor having a first fluid flow path therein operable to compress inlet air, means for combusting the compressed inlet air with fuel for producing a discharge of motive fluid, means forming a turbine for extracting energy from said motive fluid discharge and operable to drive said rotor to induce flow through said first flow path, recuperator means for transferring heat of exhaust from said turbine to discharge flow from said first path prior to its passage into said combustor means, means including said recuperator means, intercooler means, and a secondary compressor for reducing the pressure of said turbine exhaust gas to a predetermined subatmospheric pressure level to define a subatmospheric source of heating fluid, thereby to improve engine cycle efficiency, and means including said secondary compressor defining a compression flow path operative to draw fluid from said subatmospheric source for discharge to atmosphere to produce an exhaust compression mode thereby to complete engine gas flow back to atmosphere and passenger compartment heater means including a core located within said subatmospheric source of heating fluid and means for transferring heat therefrom for conditioning the passenger compartment of an automobile powered by the gas turbine engine assembly.

3. An automotive gas turbine engine assembly comprising: a rotor having a first fluid flow path therein operable to compress inlet air, means for combusting the compressed inlet air with fuel for producing a discharge of motive fluid, means forming a turbine for extracting energy from said motive fluid discharge and operable to drive said rotor to induce flow through said first flow path, recuperator means for transferring heat of exhaust from said turbine into discharge flow from said first path prior to its passage into said combustor means, means including said recuperator means, intercooler means, and a secondary compressor for reducing the pressure of said turbine exhaust gas to a predetermined subatmospheric pressure level to define a subatmospheric source of heating fluid, thereby to improve engine cycle efficiency, and means including said secondary compressor defining a compression flow path operative to draw fluid from said subatmospheric source for discharge to atmosphere to produce an exhaust compression mode thereby to complete engine gas flow back to atmosphere and means for tapping said subatmospheric source of pressure as a source of vacuum for powering vacuum operated automobile accessories.

4. An automotive gas turbine engine assembly comprising: a rotor having a first fluid flow path therein operable to compress inlet air, means for combusting the compressed inlet air with fuel for producing a discharge of motive fluid, means forming a turbine for extracting energy from said motive fluid discharge and operable to drive said rotor to induce flow through said first flow path, recuperator means for transferring heat of exhaust from said turbine to discharge flow from said first path prior to its passage into said combustor means, means including said recuperator means, intercooler means and a secondary compressor for reducing the pressure of said turbine exhaust gas to a predetermined subatmospheric pressure level thereby to improve engine cycle efficiency, and means defining said secondary compressor as a compression flow path in said rotor operative to draw fluid from said subatmospheric source for discharge to atmosphere to produce an exhaust compression mode thereby to complete engine gas flow back to atmosphere, and means located within said rotor to cause flow through said compression flow path to transfer heat from said rotor for reducing the operating temperature thereof so as to improve its thermal mechanical characteristics.

* * * * *